(12) United States Patent
Lee et al.

(10) Patent No.: US 10,279,401 B2
(45) Date of Patent: May 7, 2019

(54) CUTTING INSERT AND TOOL HOLDER ON WHICH CUTTING INSERT IS PROVIDED

(71) Applicant: KORLOY INC., Seoul (KR)

(72) Inventors: Sang-Yong Lee, Cheongju-si (KR); Ki-Chan Nam, Cheongju-si (KR); Nam-Sun Lee, Cheongju-si (KR); Kane-Hee Lee, Cheongju-si (KR); Sun-Yong Ahn, Cheongju-si (KR); Young-Heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 53 days.

(21) Appl. No.: 15/504,246

(22) PCT Filed: Jul. 21, 2015

(86) PCT No.: PCT/KR2015/007559
§ 371 (c)(1),
(2) Date: Feb. 15, 2017

(87) PCT Pub. No.: WO2016/027998
PCT Pub. Date: Feb. 25, 2016

(65) Prior Publication Data
US 2017/0259356 A1 Sep. 14, 2017

(30) Foreign Application Priority Data

Aug. 18, 2014 (KR) .......... 10-2014-0107094

(51) Int. Cl.
| B23C 5/20 | (2006.01) |
| B23C 5/22 | (2006.01) |
| B23C 5/06 | (2006.01) |

(52) U.S. Cl.
CPC .......... *B23C 5/2247* (2013.01); *B23C 5/06* (2013.01); *B23C 5/2221* (2013.01);
(Continued)

(58) Field of Classification Search
CPC ........ B23C 2200/045; B23C 2200/128; B23C 2200/161; B23C 2200/168;
(Continued)

(56) References Cited

U.S. PATENT DOCUMENTS

| 2011/0103905 A1 | 5/2011 | Morrison et al. |
| 2012/0070239 A1* | 3/2012 | Park .................. B23C 5/06 407/42 |

(Continued)

*Primary Examiner* — Alan Snyder
(74) *Attorney, Agent, or Firm* — Rabin & Berdo, P.C.

(57) ABSTRACT

Provided are a cutting insert and a tool holder on which the cutting insert is provided. The cutting insert includes a circular upper surface, a circular lower surface, a cylindrical lateral surface for connecting the upper surface and the lower surface, an upper cutting edge formed between the upper surface and the lateral surface, a lower cutting edge formed between the lower surface and the lateral surface, and a plurality of rotation-preventing parts provided at the lateral surface so as to prevent the cutting insert from rotating with respect to the tool holder. Each rotation preventing part includes an inner curved surface recessed toward the center of the lateral surface and convexly rounded so as to form concentric circles in conjunction with the lateral surface, and a stepped rotation-preventing surface parallel to the axial direction of the insert and connecting the inner curved surface and the lateral surface.

12 Claims, 10 Drawing Sheets

(52) U.S. Cl.
CPC .. *B23C 2200/045* (2013.01); *B23C 2200/128* (2013.01); *B23C 2200/161* (2013.01); *B23C 2200/168* (2013.01); *B23C 2200/363* (2013.01); *B23C 2210/168* (2013.01)

(58) Field of Classification Search
CPC ........ B23C 2200/363; B23C 2210/168; B23C 5/2221; B23C 5/2247; B23C 5/06
See application file for complete search history.

(56) References Cited

U.S. PATENT DOCUMENTS

2013/0330135 A1* 12/2013 Burtscher ............... B23C 5/207
407/42
2014/0348600 A1* 11/2014 Matsubara ............ B23C 5/2221
407/64

* cited by examiner

CUTTING INSERT AND TOOL HOLDER ON WHICH CUTTING INSERT IS PROVIDED

TECHNICAL FIELD

The present disclosure relates to a cutting insert used for cutting precision, and a cutting tool on which the cutting insert is provided.

BACKGROUND ART

Generally, a cutting insert is fastened to a cutting tool provided on a machine tool and used for cutting a workpiece that is generally formed of ferrous or nonferrous metals, non-metal material, and so on.

Generally, such cutting insert includes an upper surface, a lower surface, and a plurality of lateral surfaces connecting the upper surface and the lower surface. An upper cutting edge is provided between the lateral surface and the upper surface, and a lower cutting is provided between the lateral surface and the lower surface.

Referring to FIGS. 8 to 10, US2011/0103905 A1 illustrates a cutting insert and a tool holder. For reference, FIGS. 8 to 10 each correspond to FIGS. 1, 4, and 6 of US2011/0103905 A1 mentioned above, and the same reference numerals are used for convenience of explanation.

The cutting insert mentioned above is a double-sided circular insert 10 which is provided on a pocket of the tool holder, and which includes a plurality of first protrusions 26 formed on a first inner surface 24 of a circular upper portion 12, and a plurality of second protrusions 36 formed on a second inner surface 34, for mating with a plurality of dimples (not illustrated) formed in a pocket of the tool holder. Accordingly, because the round cutting insert 10 provided on the tool holder 40 has a circular shape, rotation torque is applied due to reaction force thereof during processing of the workpiece, but a plurality of first or second protrusions 26 or 36 mated with a plurality of dimples formed in the pocket 42 of the tool holder 40 (in a double-sided cutting insert, a plurality of first protrusions 26 may be mated with a plurality of dimples 48 or a plurality of second protrusions 36 may be mated with the dimples 48) may prevent the insert 10 from rotating from the tool holder 40 even under the rotation torque by the tool holder 40.

However, in the insert 10 of a related technology, a plurality of first or second protrusions 26 or 36 mated with a plurality of dimples 48 of the pocket 42 are formed not on a circumferential surface 16 of the insert 10, but on a first inner surface 24 of an insert upper portion 12 or on a second dinner surface 34 of an insert lower portion 14 which has a relatively narrower area. Accordingly, it is difficult to ensure a sufficient area for mating between the insert 10 and the pocket 42, thus causing problem of the insert 10 being unstably provided.

DISCLOSURE OF INVENTION

Technical Problem

A technical object of the present disclosure is to provide a cutting insert capable of increasing provision stability with a pocket against a rotation torque, and a tool holder on which the cutting insert is provided.

Further, although not explicitly described, the present disclosure includes other objects that can be derived from the configuration of the present disclosure.

Solution to Problem

In order to achieve the objects mentioned above, according to an exemplary embodiment of the present disclosure, a cutting insert may include a circular upper surface, a circular lower surface, a cylindrical lateral surface connecting the upper surface and the lower surface, an upper cutting edge formed between the upper surface and the lateral surface, a lower cutting edge formed between the lower surface and the lateral surface, and a plurality of rotation-preventing parts provided on the lateral surface to prevent rotation with respect to the tool holder, in which each of the plurality of rotation-preventing parts may include an inner curved surface recessed toward a center of the lateral surface and convexly rounded so as to form concentric circles in conjunction with the lateral surface, and a rotation-preventing surface of a stepped shape, parallel to an axis direction of the insert and connecting the inner curved surface and the lateral surface.

A plurality of holder contact surfaces may be additionally formed on the lateral surface to contact the tool holder. The plurality of holder contact surfaces may be formed between the respective rotation-preventing parts, may have a shape of being convexly rounded so as to form concentric circles in conjunction with the lateral surface, and may protrude outward farther than the inner curved surface.

First and second relief surfaces may be additionally formed on the lateral surface. The first relief surface may be formed from the upper cutting edge to the plurality of rotation-preventing parts and the plurality of holder contact surfaces to thus configure an overall upper circumferential surface of the lateral surface, and may have a positive type in which a diameter gradually decreases from the upper cutting edge toward the lower surface. The second relief surface may be formed from the lower cutting edge to the plurality of rotation-preventing parts and the plurality of holder contact surfaces to thus configure an overall lower circumferential surface of the lateral surface, and has a positive type in which a diameter gradually decreases from the lower cutting edge toward the upper surface.

Transition surfaces may be additionally formed between the plurality of holder contact surfaces and the first relief surface, and between the plurality of holder contact surfaces and the second relief surface, respectively.

With reference to the transition surfaces, the plurality of holder contact surfaces may be sunken farther toward a center of the lateral surface than the first and second relief surfaces.

Lift-preventing surfaces of a stepped shape may be additionally formed between the inner curved surface and the first relief surface, and between the inner curved surface and the second relief surface, respectively.

The rotation-preventing surface may be a plane.

The rotation-preventing surface may be formed perpendicularly to the inner curved surface.

The plurality of rotation-preventing parts may be provided at a spacing along a circumference of the lateral surface at any of angles between 45 and 90 degrees.

Meanwhile, a tool holder according to an exemplary embodiment of the present disclosure may be a tool holder on which the cutting insert described above according to exemplary embodiments is provided, and the tool holder may include a pocket including a pocket bottom surface and a pocket lateral surface, to receive the cutting insert, and a locking projection protruding on the pocket lateral surface to be inserted into the inner curved surface and locked into the rotation-preventing surface.

Effects of Invention

With the configuration described above, the cutting insert and the tool holder on which the cutting insert is provided according to the exemplary embodiments of the present disclosure can provide effects as follows.

According to an exemplary embodiment of the present disclosure, a plurality of rotation-preventing parts including an inner curved surface and a rotation-preventing surface are provided on a cylindrical lateral surface, such that a plurality of rotation-preventing parts can be provided elongatedly along a lengthwise direction (identical to an axis direction of the insert) thereof on the cylindrical lateral surface and the tool holder can have a wider mating area with the pocket. Basically, even when the insert is subject to rotation torque, such wide mating area gives increased stability for the insert to be provided on the pocket.

Further, according to exemplary embodiments of the present disclosure, since the inner curved surface forming the rotation-preventing part has a shape of being convexly rounded to form concentric circles in conjunction with the cylindrical lateral surface, compared to having concave shape, degradation of the rigidity under the load exerted onto the insert during process can be minimized.

Further, according to exemplary embodiments of the present disclosure, since the rotation-preventing surface forming the rotation-preventing parts is parallel to the axis direction of the insert and have a stepped shape, the rotation-preventing surface is accurately placed across the direction of rotation of the insert to thereby ensure that the insert 100 is prevented from rotating.

Further, the effects of the present disclosure are not limited to those mentioned above, but include those that are derived from the detailed description of the present disclosure.

MODE FOR THE INVENTION

Hereinbelow, exemplary embodiments of the present disclosure will be described in detail with reference to accompanying drawings to enable those skilled in the art to easily work the present disclosure. However, the present disclosure is not limited specific embodiments described herein and may have various different implementations FIG. 1 is a perspective view of a cutting insert, seen on a plane according to an exemplary embodiment of the present disclosure, and FIG. 2 is perspective view of a cutting insert, seen from below according to an exemplary embodiment of the present disclosure.

Figure 1:
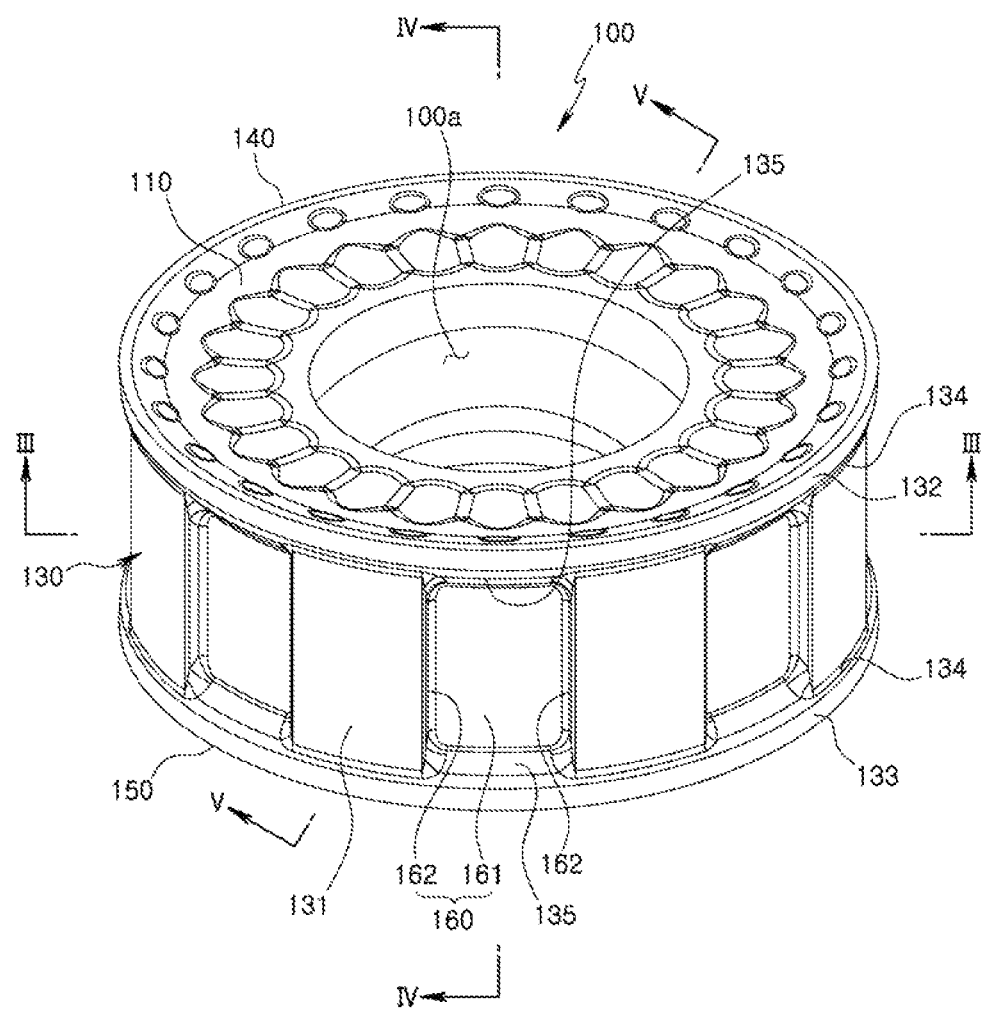
FIG. 1 is a perspective view of a cutting insert, seen on a plane according to an exemplary embodiment of the present disclosure.
Figure 2:
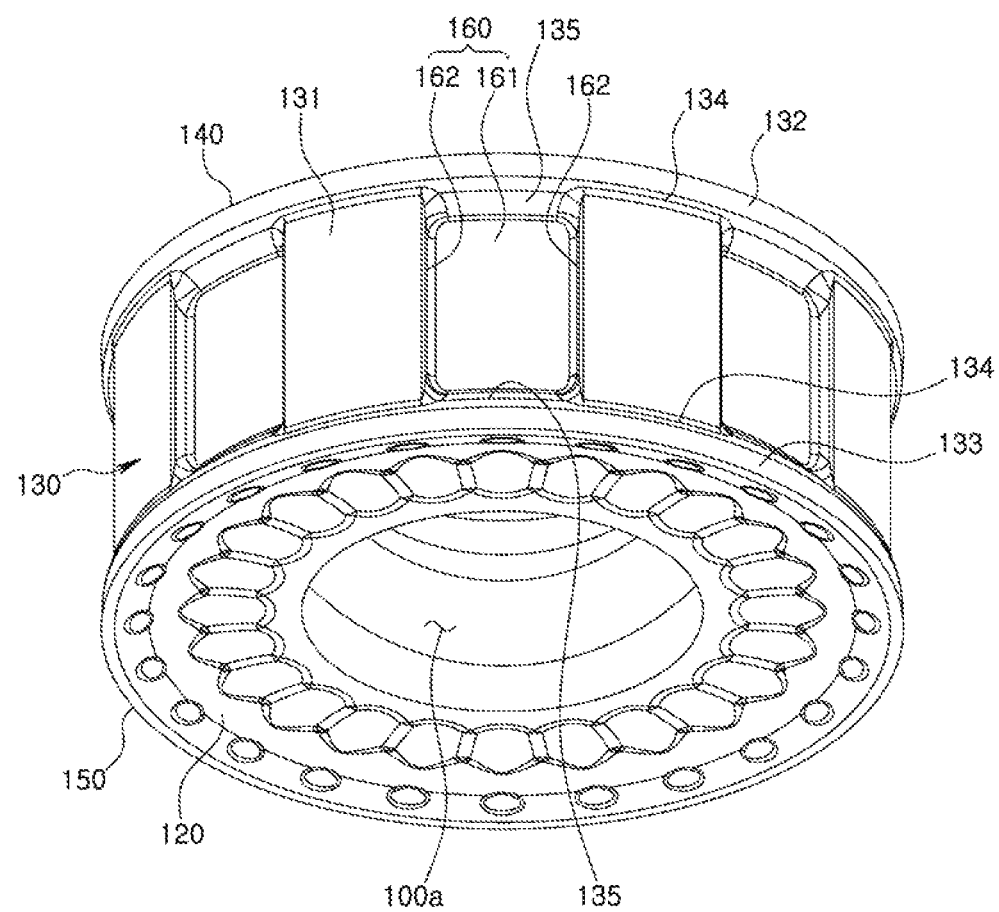
FIG. 2 is perspective view of a cutting insert, seen from below according to an exemplary embodiment of the present disclosure.
Figure 3:
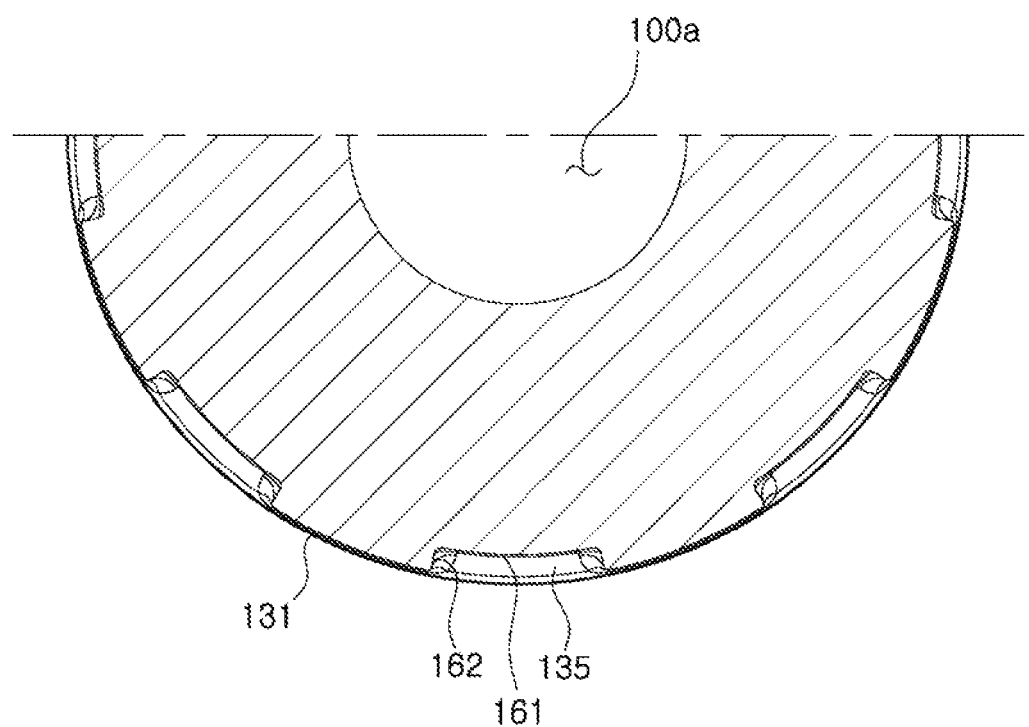
FIG. 3 is a cross-sectional view taken on line III-III of the cutting insert of FIG. 1.
Figure 4:
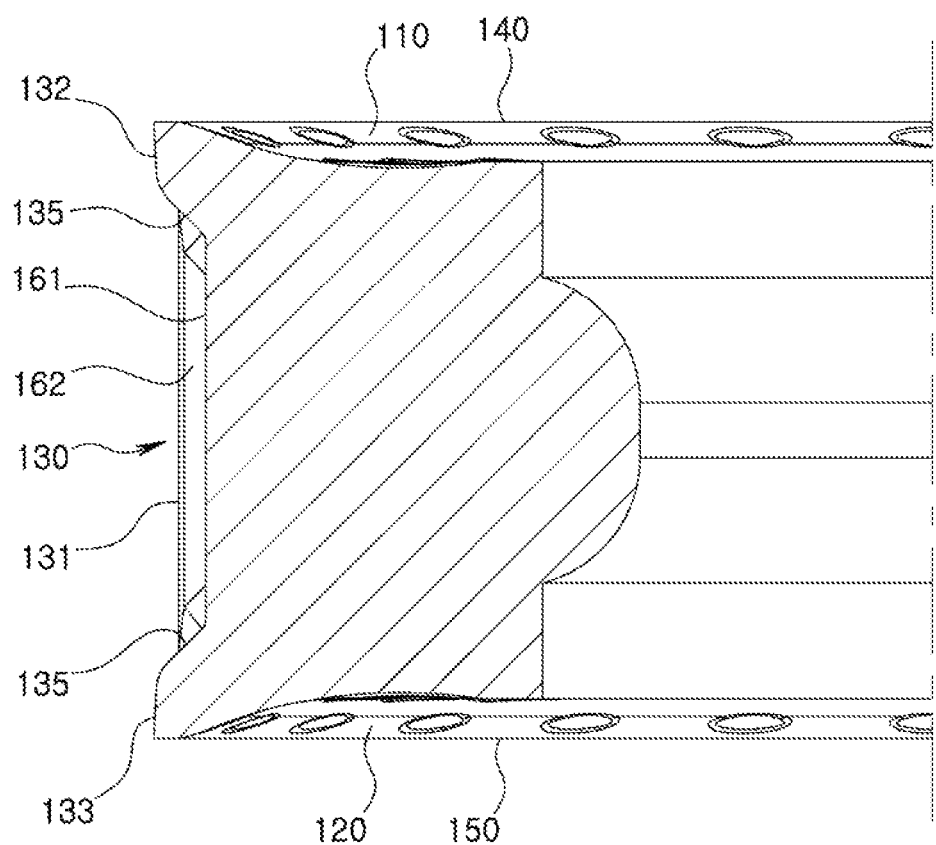
FIG. 4 is a cross-sectional view taken on line IV-IV of the cutting insert of FIG. 1.
Figure 5:
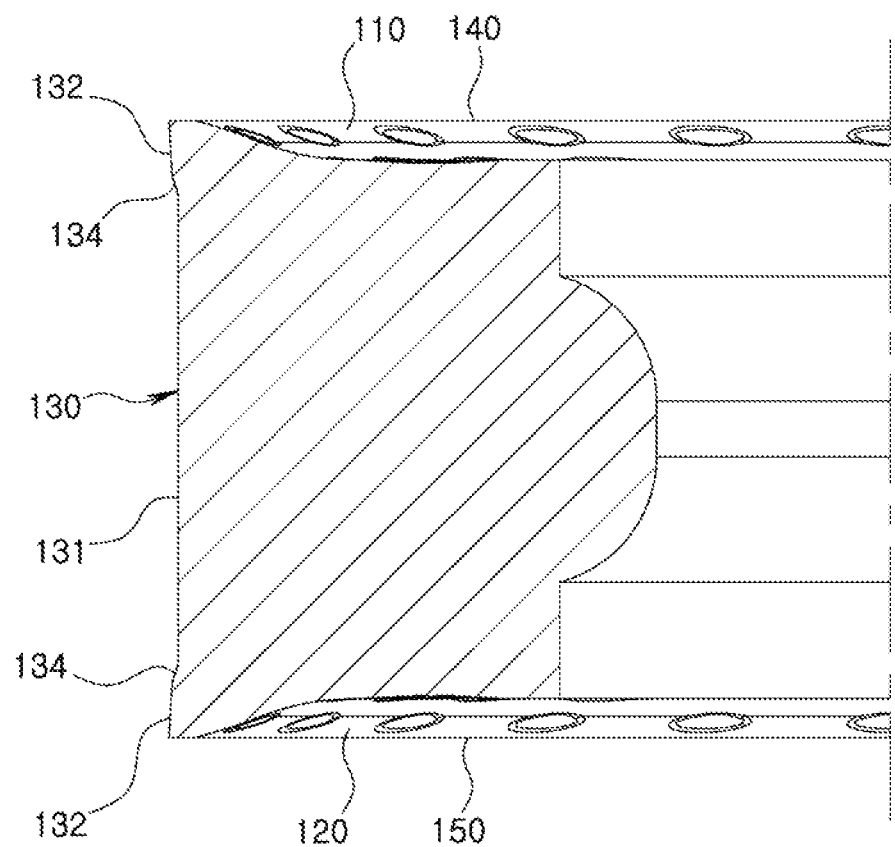
FIG. 5 is a cross-sectional view taken on line V-V of the cutting insert of FIG. 1.

FIG. 3 is a cross-sectional view taken on line III-III of the cutting insert of FIG. 1, FIG. 4 is a cross-sectional view taken on line IV-IV of the cutting insert of FIG. 1, and FIG. 5 is a cross-sectional view taken on line V-V of the cutting insert of FIG. 1.

Figure 6:
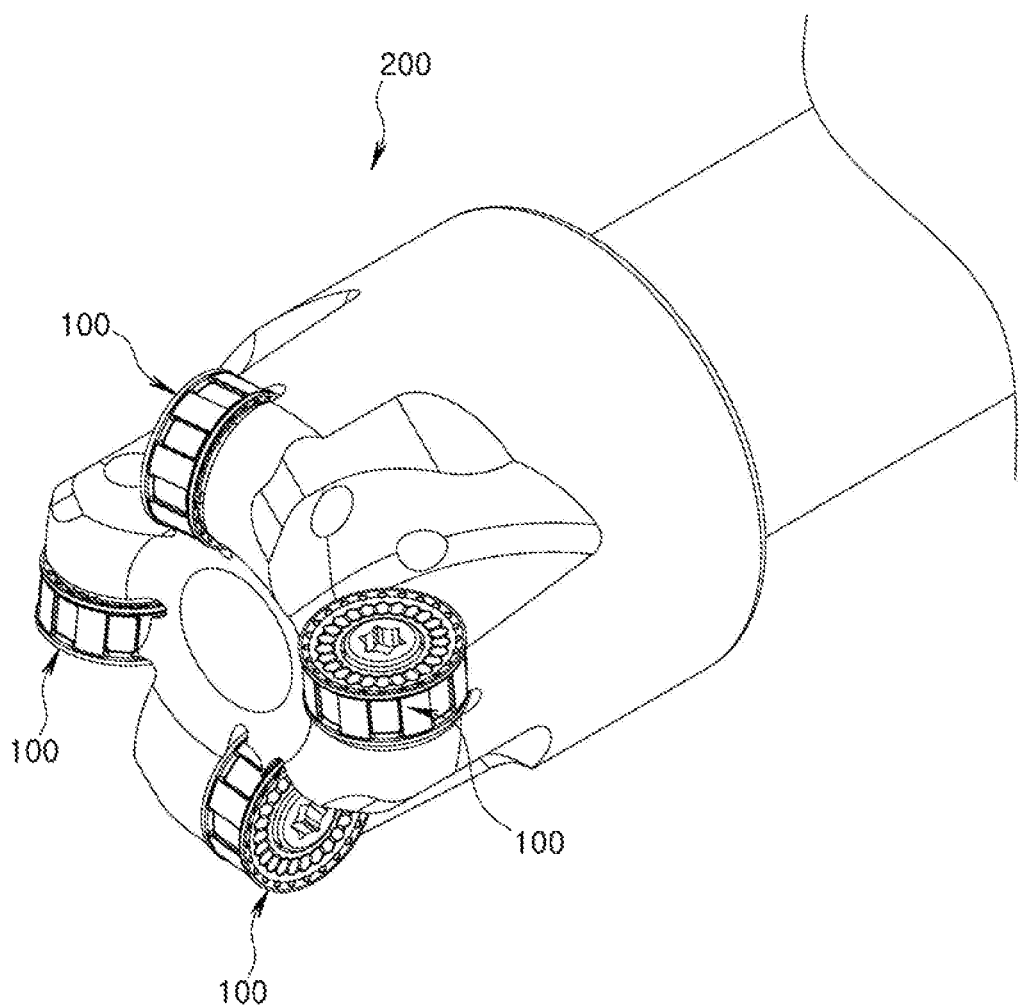
FIG. 6 is a perspective view illustrating a tool holder provided with the cutting insert of FIG. 1.
Figure 7:
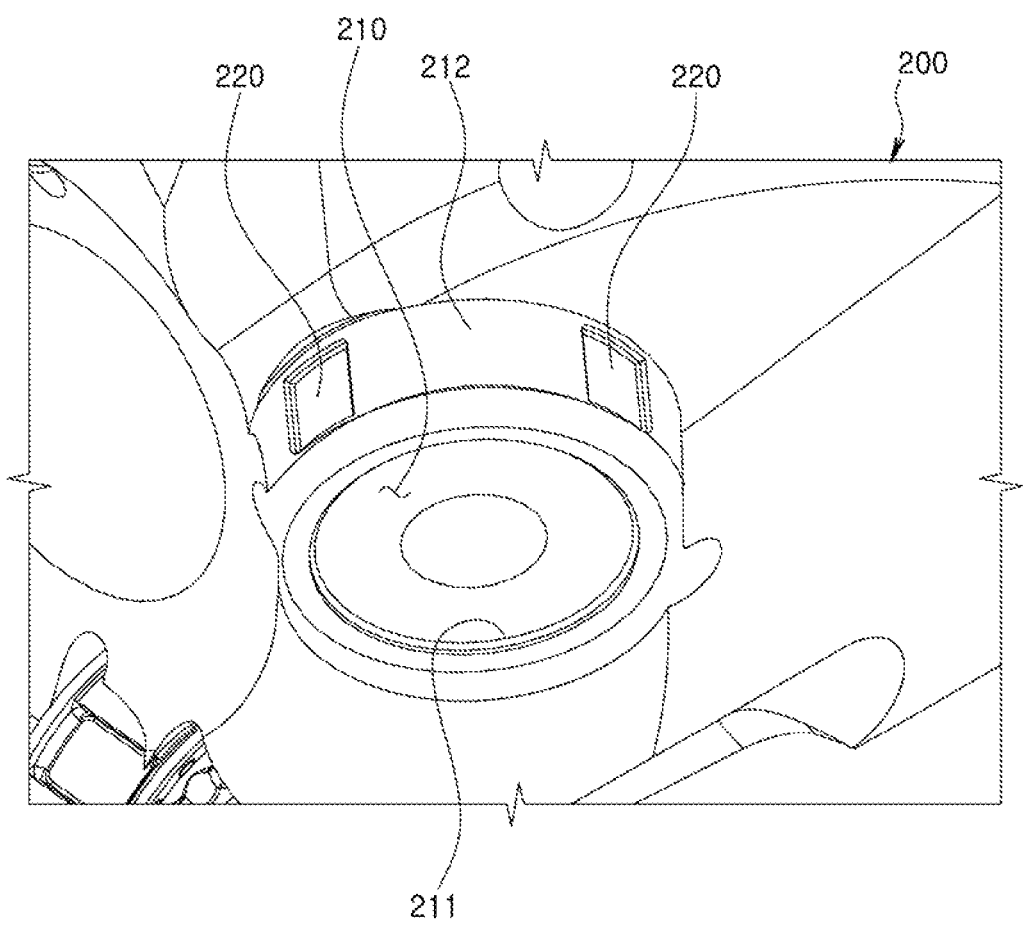
FIG. 7 is a perspective view illustrating a main part where a cutting insert is removed from a pocket of the tool holder of FIG. 6.
Figure 8:
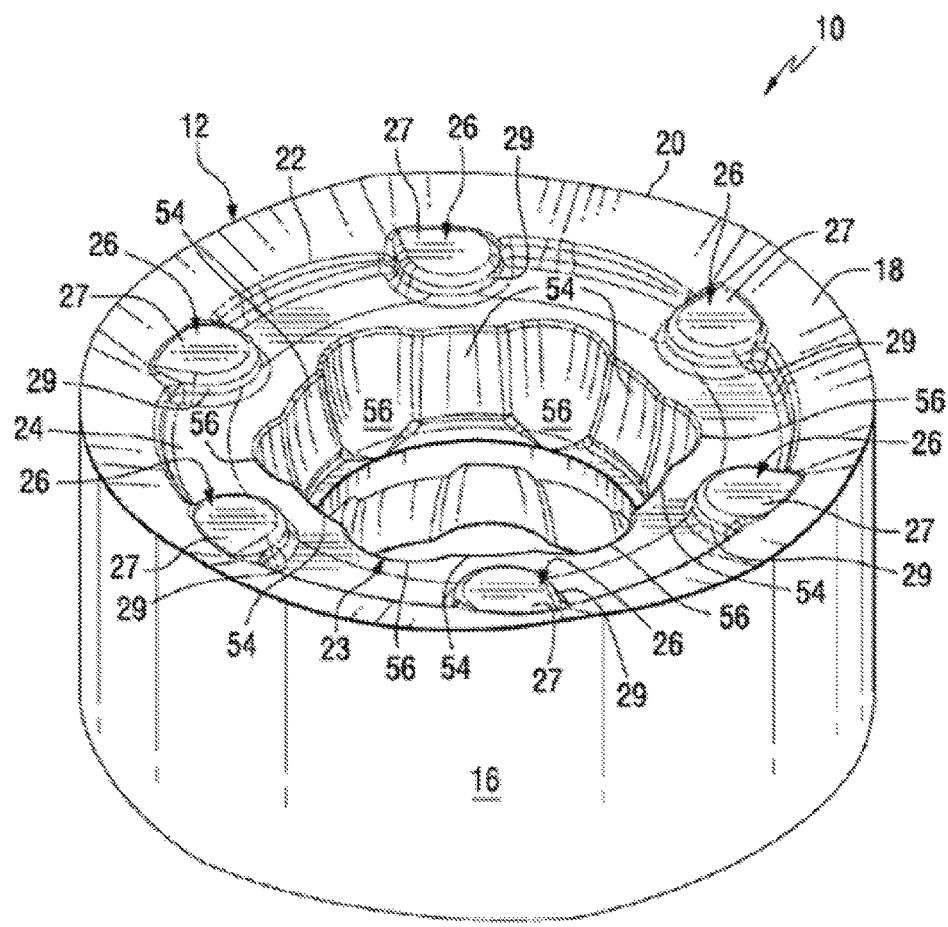
FIG. 8 is a perspective view of a related insert.
Figure 9:
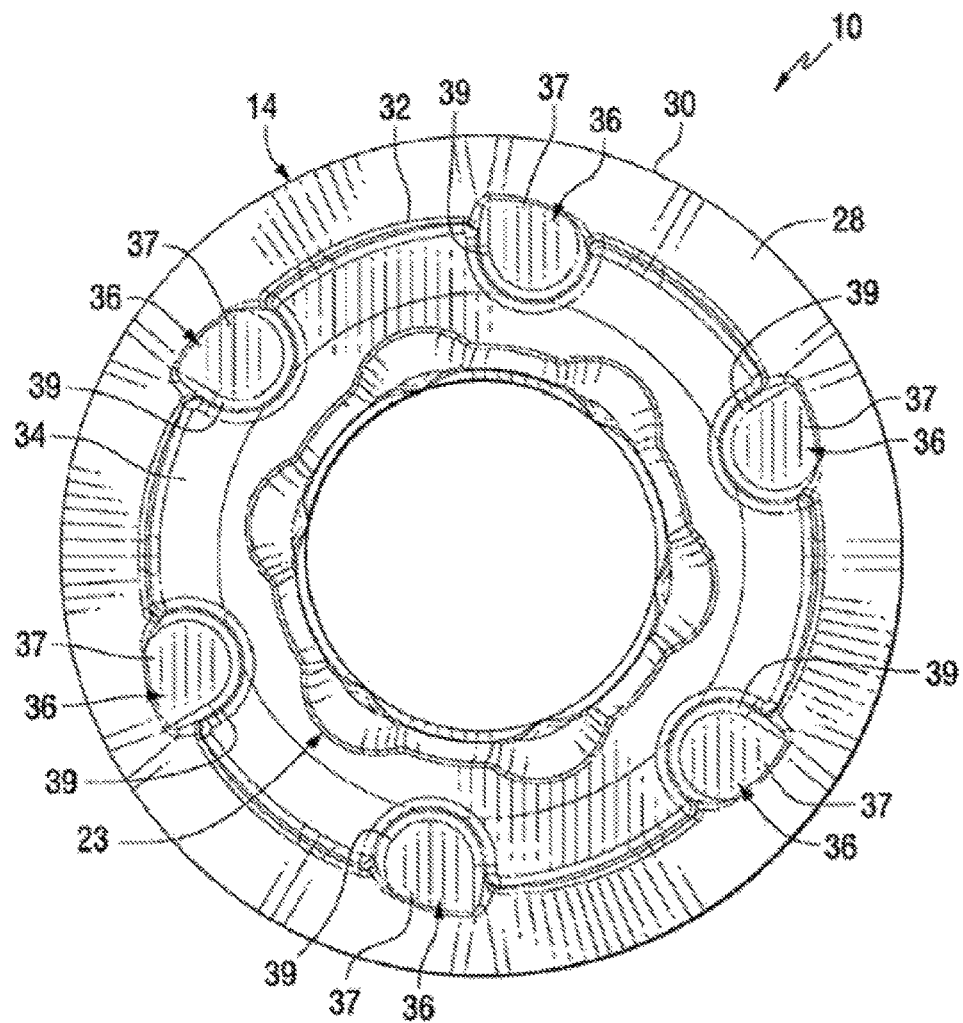
FIG. 9 illustrates a lower portion of the insert of FIG. 8.
Figure 10:
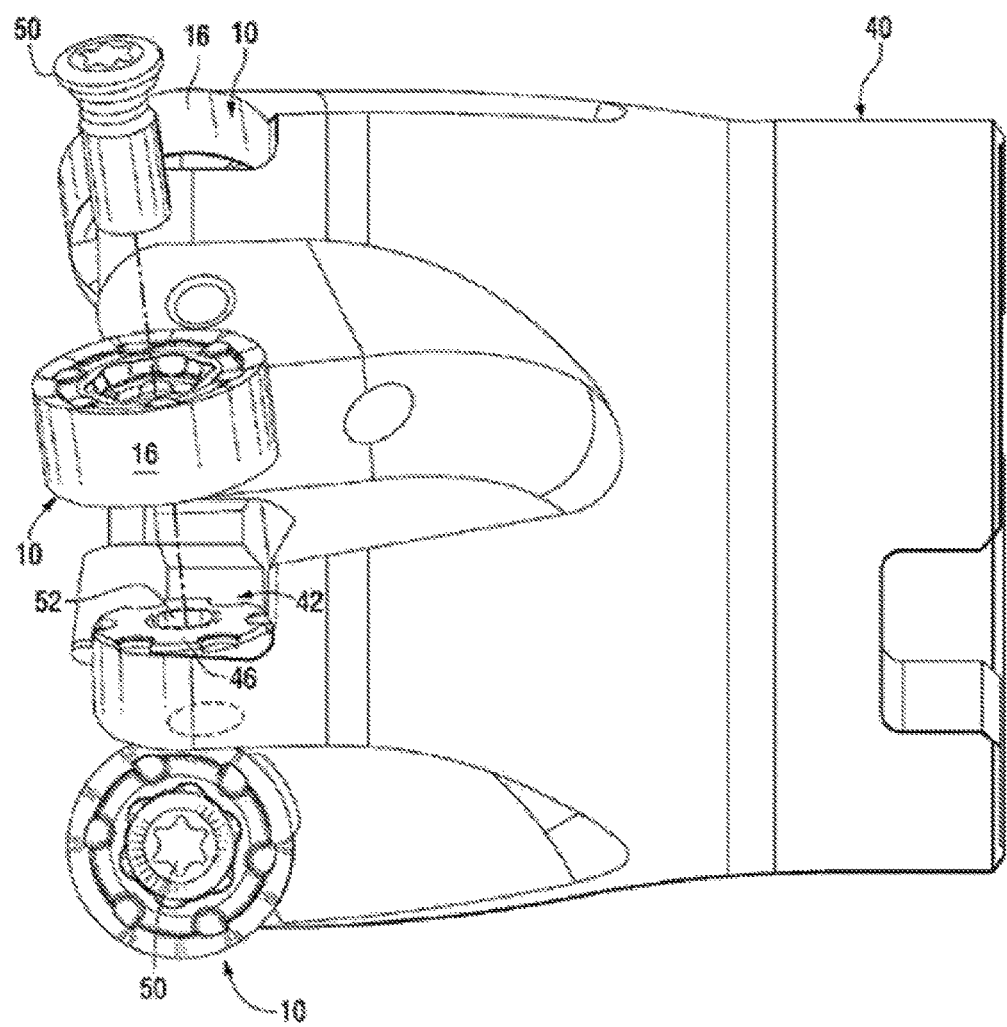
FIG. 10 is a perspective view illustrating an assembled state in which the insert of FIG. 8 is provided on the tool holder.

FIG. 6 is a perspective view illustrating a tool holder provided with the cutting insert of FIG. 1, and FIG. 7 is a perspective view illustrating a main part where a cutting insert is removed from a pocket of the tool holder of FIG. 6.

According to an exemplary embodiment of the present disclosure, the cutting insert 100 includes an upper surface 110, a lower surface 120, a lateral surface 130, an upper cutting edge 140, a lower cutting edge 150, and a plurality of rotation-preventing parts 160, as illustrated in FIGS. 1 to 5. The cutting insert according to an exemplary embodiment may be a double-sided cutting insert.

As illustrated in FIGS. 1 and 2, the upper surface 110 and the lower surface 120 are in a symmetrical structure with each other and both have a substantially circular shape with a fastening hole 100a for fastening with the tool holder 200 formed by penetrating at a center. Specifically, as illustrated in FIGS. 6 and 7, the upper surface 110 or the lower surface 120 of the insert 100 may be in contact with a pocket bottom surface 211 of the tool holder 200 such that the upper cutting edge 140 is used as a cutting edge for cutting a workpiece (not illustrated) when the lower surface 120 is in contact with the pocket bottom surface 211, while the lower cutting edge 150 is used as a cutting edge for cutting the workpiece when the upper surface 110 is in contact with the pocket bottom surface 211. Accordingly, both sides of the cutting edge can be used.

As illustrated in FIGS. 1 and 2, the lateral surface 130 has a cylindrical shape and it connects the circular upper surface 110 to the circular lower surface 120. Specifically, as illustrated in FIGS. 6 and 7, when the upper surface 110 or the lower surface 120 of the insert 100 is in contact with the pocket bottom surface 211 of the tool holder 200, a portion of the lateral surface 130 is brought into a contact with the pocket lateral surface 211 of the tool holder 200.

As illustrated in FIG. 1, the upper cutting edge 140 is formed between the upper surface 110 and the lateral surface 130, and as illustrated in FIG. 2, the lower cutting edge 150 is formed between the lower surface 120 and the lateral surface 130. Specifically, with the upper cutting edge 140 and the lower cutting edge 150 being formed, it is possible to use both sides of the insert 100.

As illustrated in FIGS. 1 and 2, a plurality of rotation-preventing parts 160 is provided on the lateral surface 130 to serve to prevent the insert 100 from rotating with respect to the tool holder 200. Specifically, since a plurality of rotation-preventing parts 160 can be provided on the cylindrical lateral surface 130, it is possible to provide a plurality of rotation-preventing parts 160 on the cylindrical lateral surface in a lengthwise direction thereof (identical to an axis direction of the insert 100) and ensure a wider mating area with the pocket 210 of the tool holder 200. Basically, the tool holder 200 can be provided on the pocket 210 with enhanced stability even when the rotation torque is applied on the insert 100.

Hereinbelow, referring to FIGS. 1 to 5, a plurality of rotation-preventing parts 160 will be described in more detail.

Each of a plurality of rotation-preventing parts 160 may include an inner curved surface 160 and a rotation-preventing surface 162, as illustrated in FIGS. 1 to 3.

As illustrated in FIG. 3, the inner curved surface 161 may have a shape that is recessed toward a center of the lateral surface 130 and is rounded convexly so as to form concentric circles in conjunction with the lateral surface 130. Accordingly, since the inner curved surface 161 forming the rotation-preventing part 160 is convexly rounded to form concentric circles in conjunction with the cylindrical lateral surface 130, compared to the concave-rounded shape or flat shape, degradation of rigidity under load exerted onto the insert 100 during cutting process can be minimized.

As illustrated in FIGS. 1 and 2, the rotation-preventing surface 162 is in parallel to an axis direction of the insert (i.e., a direction of an imaginary axis passing through a center of the upper surface 100 and a center of the lower surface 120 during rotation of the insert 100), and may have a stepped shape that connects the inner curved surface 161 with the lateral surface 130, as illustrated in FIG. 3. Accordingly, since the rotation-preventing surface 162 forming the rotation-preventing part 160 is parallel to the axis direction and has a stepped shape, the rotation-preventing surface 162 is accurately placed across the direction of rotation of the insert 100 to ensure that rotation of the insert 100 is prevented.

For example, the rotation-preventing surface 162 having the stepped shape may be a plane. Specifically, the rotation-preventing surface 162 may be formed as a plane in order to prevent a locking projection 220 (see FIG. 7) of the tool holder 200 (FIG. 7) from being moved over the rotation-preventing surface 162 and along the lateral surface. If the rotation-preventing surface 162 has a curved surface, it would be easier for the locking projection 220 of the tool holder 200 to slide onto the rotation-preventing surface 162 and escape along the lateral surface.

Further, as illustrated in FIG. 3, the rotation-preventing surface 162 may be formed approximately perpendicular with respect to the inner curved surface 161 (specifically, to a tangent line relative to the inner curved surface). Specifically, the rotation-preventing surface 162 is formed approximately perpendicular to the inner curved surface 161 for the same reason as that described immediately above for forming a plane. Accordingly, this is to form the rotation-preventing surface 162 into a perfect cliff that can prevent the locking projection 220 of the tool holder 200 from being moved over the rotation-preventing surface 162 and along the lateral surface.

In addition, a plurality of rotation-preventing parts 169 may be formed along a circumference of the lateral surface 130, at any of angles between 45 and 90 degrees and at spacing from one another. For example, as illustrated in FIG. 3, a plurality of rotation-preventing parts 160 may be provided at 45-degree spacing, respectively, or although not illustrated, they may be provided at 90-degree spacing, respectively. If a plurality of rotation-preventing parts 160 are provided respectively at 45-degree spacing as illustrated in FIG. 3, as illustrated in FIG. 7, two locking projections 220 may be correspondingly formed on the pocket lateral surface 212 at 45-degree spacing.

Hereinbelow, the lateral surface 130 of the insert will be described in more detail with reference to FIGS. 1 to 7 again.

As illustrated in FIGS. 1 and 2, a plurality of holder contact surfaces 131 may be additionally formed on the lateral surface 130 for contact with the tool holder 200. Specifically, a plurality of holder contact surfaces 131 may be disposed between the respective rotation-preventing parts 160, respectively, and may have a shape of being convexly rounded to form concentric circles in conjunction with the lateral surface 130, and may be protruded outward further than the inner curved surface 161. Accordingly, since the tool holder contact surface 131 forming concentric circles in conjunction with the lateral surface 130 is protruded outward further than the inner curved surface 161, the tool holder contact surface 131 can be stably brought into contact with the pocket lateral surface 212 of the tool holder 200.

Further, as illustrated in FIGS. 1, 2, 4 and 5, first and second relief surfaces 132, 133 may be additionally formed on the lateral surface 130. Specifically, as illustrated in FIGS. 1 and 2, the first relief surface 132 may be formed from the upper cutting edge 140 to a plurality of rotation-preventing parts 160 and a plurality of holder contact surfaces 131 to thus configure an overall upper circumferential surface of the lateral surface 130, and may have a positive-type in which the diameter gradually decreases in a direction of decreasing distance from the upper cutting edge 140 toward the lower surface 120, as illustrated in FIGS. 4 and 5. As illustrated in FIGS. 1 and 2, the second relief surface 133 may be formed from the lower cutting edge 150 to a plurality of rotation-preventing parts 160 and a plurality of holder contact surfaces 131 to thus configure an overall lower circumferential surface of the lateral surface 130, and may have a positive-type in which the diameter gradually decreases in a direction of decreasing distance from the lower cutting edge 150 toward the upper surface 110, as illustrated in FIGS. 4 and 5. Accordingly, while the workpiece is cut with the upper cutting edge 140 or the lower cutting edge 150, the lateral surface 130 is kept from contacting the workpiece. As a result, processing load can be reduced and damages to the insert 100 can be prevented.

Further, as illustrated in FIGS. 1, 2, and 5, transition surfaces 134 may be additionally between a plurality of holder contact surfaces 131 and the first relief surface 132, and between a plurality of holder contact surfaces 131 and the second relief surface 133, respectively. Specifically, a plurality of holder contact surfaces 131 may have a shape of being sunken further toward the center of the lateral surface than the first and second relief surfaces 132, 133 with reference to the transition surfaces 134. Since this also prevents a plurality of holder contact surfaces 131 from contacting the workpiece, processing load can be reduced and damages to the insert 100 can be prevented.

Further, as illustrated in FIGS. 1, 2, and 4, stepped lift-preventing surfaces 135 may be additionally formed respectively between the inner curved surface 161 and the first relief surface 132, and between the inner curved surface 161 and the second relief surface 133. Accordingly, the lift-preventing surfaces 135 prevent the insert 100 from being lifted during processing of the workpiece, and serve as the transition surfaces that connect each of the first and second relief surfaces 132, 133 to the inner curved surface 161.

Hereinbelow, a tool holder 200 according to an exemplary embodiment will be described with reference to FIGS. 6 and 7.

As illustrated in FIGS. 6 and 7, the tool holder 200 according to an exemplary embodiment is a tool holder for mounting the cutting insert, and it includes a pocket 210 and a locking projection 220.

As illustrated in FIG. 7, the pocket 210 may have a pocket bottom surface 211 and a pocket lateral surface 211, to receive the cutting insert 100 described above according to the present disclosure. The upper surface 110 or the lower surface 120 of the cutting insert 100 is positioned on the pocket bottom surface 211, and a portion of the lateral surface 130 of the cutting insert 100 is positioned on the pocket lateral surface 212.

The locking projection 220 is protruded from the pocket lateral surface 212 to be inserted into the inner curved surface 161 on the insert lateral surface 130, and locked into the rotation-preventing surface 162 of the insert lateral surface 130. Accordingly, the locking projection 220 is locked into the rotation-preventing surface 162 to prevent the rotation of the insert 100.

For example, as illustrated in FIG. 3, when a plurality of rotation-preventing parts 160 are provided at 45-degree spacing, respectively, as illustrated in FIG. 7, two locking projections 220 may be correspondingly formed on the pocket lateral surface 212 at 45-degree spacing.

As described above, the cutting insert 100 and the tool holder 200 on which the cutting insert 100 is provided may have the effects as follows.

According to an exemplary embodiment of the present disclosure, a plurality of rotation-preventing parts 160 including the inner curved surface 161 and the rotation-preventing surface 162 are provided on the cylindrical lateral surface 130, such that a plurality of rotation-preventing parts 170 can be provided elongatedly along a lengthwise direction (identical to an axis direction of the insert 100) thereof on the cylindrical lateral surface 130 and the tool holder 200 can have a wider mating area with the pocket 210. Basically, even when the insert 100 is subject to rotation torque, such wide mating area gives increased stability for the insert 100 to be provided on the pocket 210.

Further, according to exemplary embodiments of the present disclosure, since the inner curved surface 161 forming the rotation-preventing part 160 has a shape of being convexly rounded to form concentric circles in conjunction with the cylindrical lateral surface 140, compared to having concave shape, degradation of the rigidity under the load exerted onto the insert 100 during process can be minimized.

Further, according to exemplary embodiments of the present disclosure, since the rotation-preventing surface 162 forming the rotation-preventing parts 160 is parallel to the axis direction of the insert 100 and have a stepped shape, the rotation-preventing surface 162 is accurately placed across the direction of rotation of the insert 100 to thereby ensure that the insert 100 is prevented from rotating.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

The present disclosure is industrially applicable since it relates to a cutting insert and a tool holder on which the cutting insert is provided and is thus applicable in cutting a workpiece.

What is claimed is:

1. A cutting insert to be provided on a tool holder, comprising:
   a circular upper surface, a circular lower surface, a cylindrical lateral surface connecting the upper surface and the lower surface, an upper cutting edge formed between the upper surface and the lateral surface, a lower cutting edge formed between the lower surface and the lateral surface, and a plurality of rotation-preventing parts provided on the lateral surface to prevent rotation with respect to the tool holder;
   a plurality of holder contact surfaces formed on the lateral surface to contact the tool holder;
   a first relief surface formed on the lateral surface; and
   a second relief surface formed on the lateral surface,
   wherein each of the plurality of rotation-preventing parts comprises,
      an inner curved surface recessed toward a center of the lateral surface and convexly rounded so as to form concentric circles in conjunction with the lateral surface, and
      a rotation-preventing surface of a stepped shape, parallel to an axis direction of the insert and connecting the inner curved surface and the lateral surface,
   wherein the first relief surface is formed from the upper cutting edge to the plurality of rotation-preventing parts and the plurality of holder contact surfaces to thus configure an overall upper circumferential surface of the lateral surface, and has a positive type in which a diameter gradually decreases from the upper cutting edge toward the lower surface,
   wherein the second relief surface is formed from the lower cutting edge to the plurality of rotation-preventing parts and the plurality of holder contact surfaces to thus configure an overall lower circumferential surface of the lateral surface, and has a positive type in which a diameter gradually decreases from the lower cutting edge toward the upper surface,
   wherein the rotation-preventing surface is a plane, and
   wherein the rotation-preventing surface is formed perpendicularly to the inner curved surface.

2. The cutting insert of claim 1, wherein the plurality of holder contact surfaces are disposed between the respective rotation-preventing parts, have a shape of being convexly rounded so as to form concentric circles in conjunction with the lateral surface, and protrude outward farther than the inner curved surface.

3. A tool holder on which the cutting insert of claim 2 is provided, the tool holder comprising:
   a pocket comprising a pocket bottom surface and a pocket lateral surface, to receive the cutting insert; and
   a locking projection protruding on the pocket lateral surface to abut against the inner curved surface and the rotation-preventing surface.

4. The cutting insert of claim 1, further comprising transition surfaces formed between the plurality of holder contact surfaces and the first relief surface, and between the plurality of holder contact surfaces and the second relief surface, respectively.

5. The cutting insert of claim 4, wherein, with reference to the transition surfaces, the plurality of holder contact surfaces are sunken farther toward a center of the lateral surface than the first and second relief surfaces.

6. A tool holder on which the cutting insert of claim 5 is provided, the tool holder comprising:
   a pocket comprising a pocket bottom surface and a pocket lateral surface, to receive the cutting insert; and
   a locking projection protruding on the pocket lateral surface to abut against the inner curved surface and the rotation-preventing surface.

7. A tool holder on which the cutting insert of claim 4 is provided, the tool holder comprising:

a pocket comprising a pocket bottom surface and a pocket lateral surface, to receive the cutting insert; and a locking projection protruding on the pocket lateral surface to abut against the inner curved surface and the rotation-preventing surface.

8. The cutting insert of claim 1, further comprising lift-preventing surfaces of a stepped shape, formed between the inner curved surface and the first relief surface, and between the inner curved surface and the second relief surface, respectively.

9. A tool holder on which the cutting insert of claim 8 is provided, the tool holder comprising:

a pocket comprising a pocket bottom surface and a pocket lateral surface, to receive the cutting insert; and a locking projection protruding on the pocket lateral surface to abut against the inner curved surface and the rotation-preventing surface.

10. The cutting insert of claim 1, wherein the plurality of rotation-preventing parts are provided at a spacing along a circumference of the lateral surface at any of angles between 45 and 90 degrees.

11. A tool holder on which the cutting insert of claim 10 is provided, the tool holder comprising:

a pocket comprising a pocket bottom surface and a pocket lateral surface, to receive the cutting insert; and a locking projection protruding on the pocket lateral surface to abut against the inner curved surface and the rotation-preventing surface.

12. A tool holder on which the cutting insert of claim 1 is provided, the tool holder comprising:

a pocket comprising a pocket bottom surface and a pocket lateral surface, to receive the cutting insert; and a locking projection protruding on the pocket lateral surface to abut against the inner curved surface and the rotation-preventing surface.

* * * * *